(12) United States Patent
Malkov et al.

(10) Patent No.: US 9,521,656 B2
(45) Date of Patent: Dec. 13, 2016

(54) METHOD AND APPARATUS FOR USING RADIO CHANNELS

(75) Inventors: Andrei Malkov, Muurla (FI); Antti Sorri, Helsinki (FI); Cassio Ribeiro, Espoo (FI); Enrico Rantala, Ilttala (FI)

(73) Assignee: Nokia Technologies Oy, Espoo (FI)

( * ) Notice: Subject to any disclaimer, the term of this patent is extended or adjusted under 35 U.S.C. 154(b) by 413 days.

(21) Appl. No.: 14/348,893

(22) PCT Filed: Oct. 4, 2011

(86) PCT No.: PCT/FI2011/050855
§ 371 (c)(1),
(2), (4) Date: Jun. 26, 2014

(87) PCT Pub. No.: WO2013/050645
PCT Pub. Date: Apr. 11, 2013

(65) Prior Publication Data
US 2014/0328294 A1 Nov. 6, 2014

(51) Int. Cl.
*H04W 16/14* (2009.01)
*H04W 72/02* (2009.01)
*H04W 72/08* (2009.01)

(52) U.S. Cl.
CPC ............ *H04W 72/02* (2013.01); *H04W 16/14* (2013.01); *H04W 72/08* (2013.01)

(58) Field of Classification Search
None
See application file for complete search history.

(56) References Cited

U.S. PATENT DOCUMENTS

| 5,448,754 A * | 9/1995 | Ho ................... H04B 1/1027 455/454 |
| 8,948,085 B2 * | 2/2015 | Barbieri ............ H04W 72/082 370/328 |
| 2010/0214965 A1 | 8/2010 | Kim et al. |
| 2011/0222493 A1 | 9/2011 | Mangold et al. |
| 2012/0039183 A1 * | 2/2012 | Barbieri ............... H04W 16/14 370/241.1 |

(Continued)

FOREIGN PATENT DOCUMENTS

| WO | 2010088586 | 8/2010 |
| WO | 2011116240 | 9/2011 |

OTHER PUBLICATIONS

Mishra et al., "How Much White Space Is There", Electrical Engineering and Computer Sciences, Technical Report No. UCB/EECS-2009-3, Jan. 11, 2009, pp. 1-15.

(Continued)

*Primary Examiner* — Alex Skripnikov
(74) *Attorney, Agent, or Firm* — Nokia Technologies Oy

(57) ABSTRACT

In a non-limiting and example embodiment, a method is provided for controlling usage of prioritized radio channels, comprising: detecting (310), by a secondary user apparatus, an interference limitation of a first radio channel for which a primary user apparatus has priority over the secondary user apparatus, selecting (320), by the secondary user apparatus, the first radio channel for communication with another apparatus to a first direction after detecting the interference limitation, and selecting (330), by the secondary user apparatus, a second radio channel for communication with the other apparatus to a second direction, opposite to the first direction.

20 Claims, 6 Drawing Sheets

(56) References Cited

U.S. PATENT DOCUMENTS

2012/0122477 A1* 5/2012 Sadek .................. H04W 16/14
                                                                                                        455/456.1

OTHER PUBLICATIONS

"Technical and Operational Requirements for the Possible Operation of Cognitive Radio Systems in the 'White Spaces' of the Frequency Band 470-790 Mhz", ECC Report 159, Jan. 2011, pp. 1-163.
International Search Report and Written Opinion received for corresponding Patent Cooperation Treaty Application No. PCT/FI2011/050855, dated Jul. 17 2012, 13 pages.
Attar, A et. Challenges of real-time secondary usage of spectrum, Computer Networks, vol. 52, No. 4, Nov. 19, 2007, pp. 816-830.
Guodong Z. et al. Proactive detection of spectrum opprtunities in primary systems with power control, IEEE Transactions on wireless communications, vol. 8, No. 9, Sep 2009, pp. 4815-4823.

\* cited by examiner

| DL | UL | DL | UL | DL | UL |

| UL | | UL | | UL | |

1st channel 10

2nd channel 11

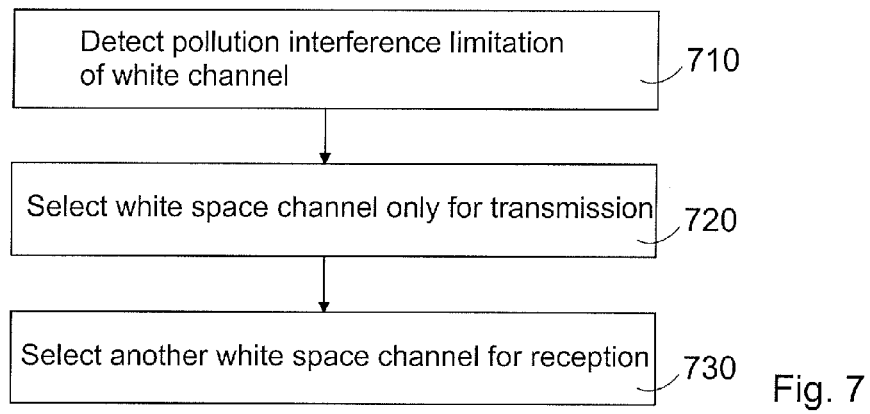
Fig. 7
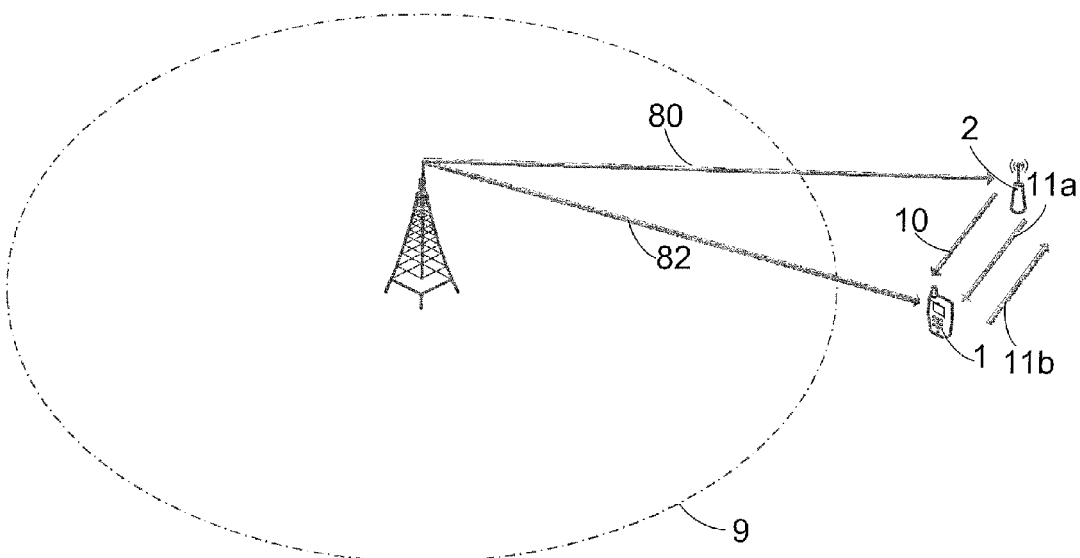
Fig. 8a
| DL | | DL | | DL | | 1st channel 10 |
| DL | UL | DL | UL | DL | UL | 2nd channel 11 |
Fig. 8b

METHOD AND APPARATUS FOR USING RADIO CHANNELS

RELATED APPLICATION

This application was originally filed as PCT Application No. PCT/FI2011/050855 filed Oct. 4, 2011.

FIELD

The present invention relates to arranging use of radio channels, and more particularly of radio channels for which a primary user has priority over secondary users.

BACKGROUND

Radio coexistence systems have been developed in which there are two or more user categories enabling prioritization of users for radio channel usage. A first user, which may be referred to as a primary user, may have priority over a second user, which may be referred to as a secondary user, for using a certain radio channel and bandwidth. For example, the primary user may be a licensed user and the secondary user a non-licensed user of the bandwidth. There may be primary users and secondary users also within a group of licensed (or non-licensed) users of a bandwidth. For example, a user first communicating on a radio channel may be a primary user and have priority over later-starting secondary users on that channel. There generally exists a need to arrange use of radio bandwidth for primary users and secondary users as efficiently as possible.

SUMMARY

Various aspects of examples of the invention are set out in the claims.

According to a first embodiment, there is provided a method, comprising: comprising: detecting, by a secondary user apparatus, an interference limitation of a first radio channel for which a primary user apparatus has priority over the secondary user apparatus, selecting, by the secondary user apparatus, the first radio channel for communication with another apparatus to a first direction after detecting the interference limitation, and selecting, by the secondary user apparatus, a second radio channel for communication with the other apparatus to a second direction, opposite to the first direction.

According to a second embodiment, there is provided an apparatus, configured to carry out the method of the first embodiment.

The invention and various embodiments of the invention provide several advantages, which will become apparent from the detailed description below.

BRIEF DESCRIPTION OF THE DRAWINGS

For a more complete understanding of example embodiments of the present invention, reference is now made to the following descriptions taken in connection with the accompanying drawings in which:

FIG. 7 illustrates a method according to an embodiment;

FIGS. 8a and 8b illustrate application of white space channels according to some embodiments;

DETAILED DESCRIPTION

Radio spectrum users having permanently or temporarily priority for using given spectrum are referred to as primary users. Such primary users may be TV broadcasting equipment, TV receivers, and wireless microphones, for example. Secondary users have lower priority in spectrum usage and they are not allowed to cause harmful interference for the primary user.

References are made below to white space and television white space related example embodiments, but it is to be appreciated that the application of presently disclosed features is not limited to any specific frequencies or cognitive radio techniques. The presently disclosed features may be applied for various arrangements facilitating prioritization of users of radio channels, such as white space or black space channels. The term "white space channel" is to be understood broadly, and to cover communication channels reserved for licensed use but made available, for example, locally or temporarily for unlicensed use because not used by primary users. Existence of a secondary user may also be allowed in a "black space channel", reserved for a primary user tolerating some interference. The primary user may be a licensed user and the secondary users may be unlicensed users of the spectrum. In some white and/or black space systems also secondary users may need to have a license in order to access white and/or black space spectrum. Furthermore, it is to be appreciated that the present features may be applied also for arranging use of radio channels in a non-white space system where primary users and secondary users may be defined within a group of licensed (or non-licensed) users of a bandwidth.

Vacant television frequencies, often referred to as TV white spaces, have been allowed for use on an unlicensed basis in many geographical areas. These TV white spaces are frequency channels allocated for television broadcasting that will not be used in given geographical areas. In some embodiments, the secondary users are cognitive radio devices operable on TV white space channels.

Figure 1:
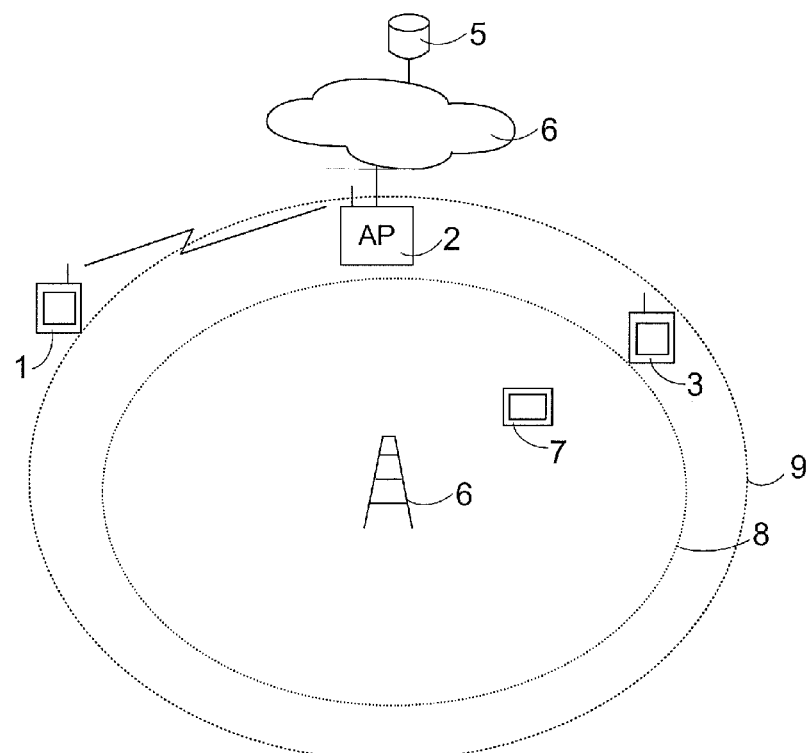
FIG. 1 illustrates an example of a white space wireless communications system.

FIG. 1 illustrates an example of a wireless communication system including secondary user devices 1, 2, 3, which may be white space radio devices. Such secondary user device may be a mobile terminal device, a mesh point, an access point, or a base station, for example.

The system may comprise a white space database 5 accessible over one or more networks 6 and an access device. The white space database 5 stores information facilitating use of white space spectrum, such as location-specific information on allowed white space channels.

Secondary use of a radio channel is limited to protect a primary user having priority of the radio channel, such as a TV broadcasting station 6 or a TV receiver 7. As illustrated in FIG. 1, a protection contour 8 may be defined to protect the primary user, and a secondary user may not operate on the radio channel if it is within the protection contour.

The rules for using white space channels are typically defined by regulatory authorities, such as the Federal Communications Commission (FCC) and the European Conference of Postal and Telecommunications Administrations CEPT. According to the rules of the FCC, a further no-talk distance or contour 9 is defined for a certain antenna height and transmission (TX) power of the secondary user device. Secondary user devices operating on co/adjacent channels can be deployed only outside of the no-talk contour 9. The CEPT uses another approach allowing greater variety of antenna heights and TX power, depending on the interference the secondary user device may cause to primary user at certain geographical location. Geographical areas are divided into 'pixels' and allowed secondary user TX powers are calculated for each pixel. In a still another embodiment, the system operates under rules of the UK authority OFCOM.

Figure 2:
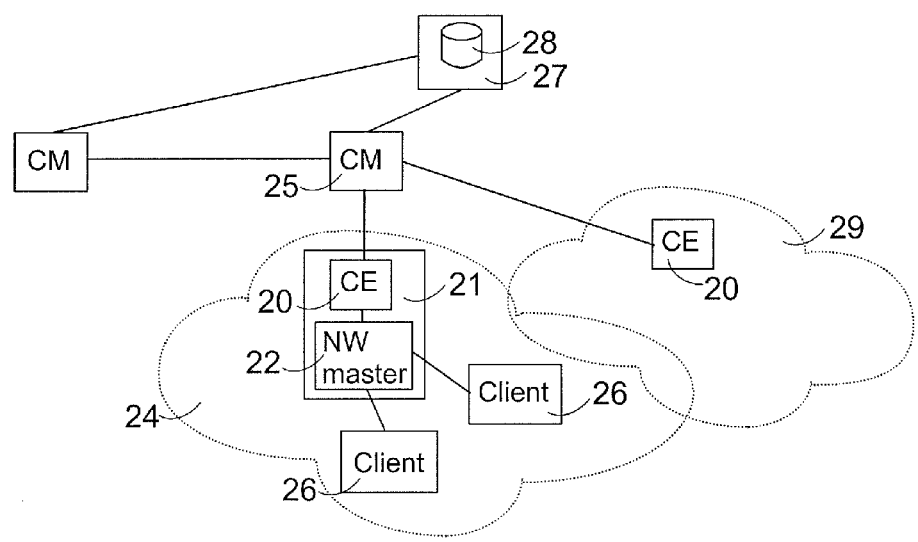
FIG. 2 illustrates entities of an example radio coexistence system.

FIG. 2 illustrates in more detail entities of an example radio coexistence system. The entities may support requirements being developed by the IEEE 802.19 coexistence group. A coexistence enabler (CE) 20 provides an interface for a secondary user radio device 21, such as a TV band device (TVBD), to the radio coexistence system and represents the secondary user device 21 and/or the radio network 24 in the coexistence system. The CE 20 may request and receive information required for coexistence from a radio entity. The collected information may comprise capabilities and resource needs of the TVBD network, and the characteristics of the radio environment, for example. The CE may reconfigure the radio device operation according to coexistence decisions received from a coexistence manager (CM) 25.

The CE 20 may reside in a device operating as the master device of the network 24, the master functionality being represented in FIG. 1 by the logical entity network (NW) master 22. However, in another embodiment, the NW master 22 and the CE 20 may be located in different devices. The network 24 may comprise one or more slave or client devices 26, operating under control of the master device 21.

The CM 25 is configured to communicate with one or more database access devices 27 comprising or connected to one or more databases 28 storing radio coexistence related information, for example a TVWS database. The database access device 27 may be arranged to receive information at least on white space channels available at a given geographical area from the database 28.

The CM 25 is the main decision maker of the coexistence system. It discovers and solves the coexistence conflicts of radio networks 24, 29 operating in a geographical area. Depending on the deployment, the CM 5 may reside in a radio terminal device, such as a TVBD, or in a network entity. The CM 25 may discover interfering networks and their CMs, and share information with other CMs and other entities. Based on the collected information it may reconfigure the operation of its own network(s), but may also perform resource reallocation for the whole neighborhood as needed.

The coexistence system illustrated in FIG. 2 may comprise or be connected to one or more wireless networks and/or some further entities, such as a Coexistence Discovery and Information Server (CDIS). The CDIS supports discovery of other coexistence managers and opens interfaces between coexistence managers to provide coexistence related information exchange among coexistence managers. However, it will be appreciated that the application of the presently disclosed features is not limited to the example systems and rules illustrated above.

Examples of planned networking techniques for white space spectrum include wireless local area (WLAN) based systems, such as super Wi-Fi, and wireless regional area networks (WRANs), such as WiMax in time-division duplex (TDD) mode. According to FCC rules, a network initiating device (typically an AP 2) is provided with a list of channels available for the device in its current location for transmission and reception. If a white space frequency channel for a TDD based system is prevented by interference, e.g. the device is within the no-talk contour 9, the white space channel may not be used.

According to some embodiments, a radio channel, for which a primary user has priority over a secondary user and which is associated with an interference limitation, is arranged for one-directional secondary use in some situations. Such situations may arise due to different locations and properties of the secondary user devices, e.g. transmission power and antenna height. The interference limitation is generally a condition in which the radio channel cannot be freely used but the secondary use is limited due to the interference it would cause.

Figure 3:
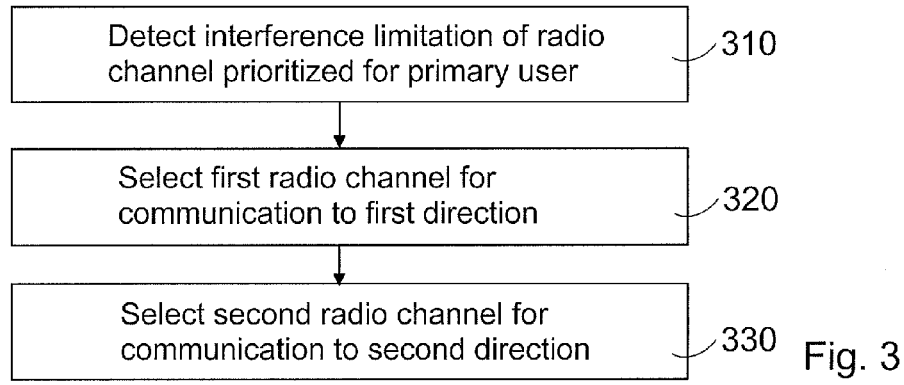
FIGS. 3 and 4 illustrate methods according to some embodiments.

According to some embodiments of the present invention, as illustrated in FIG. 3, a secondary user device, such as the device 1, 2, 3, or 21 detects 310 an interference limitation of a first radio channel in which a primary user device has priority over the secondary user device. The interference limitation may be detected based on interference sensing and/or receiving interference information from another apparatus, such as a neighboring apparatus, a network/coexistence manager apparatus, and/or an apparatus connected to a database comprising radio channel access control related information.

The secondary user device may be operable to separately check the availability of the first radio channel for transmission and reception. The secondary user device may thus be arranged to detect a direction-specific interference limitation. On the basis of this check the interference limitation and block 310 may be entered, and availability of block 320 may be detected. The secondary user device may apply transmission specific interference rule(s) to determine if the first radio channel is available for transmission and reception specific interference rule(s) to determine if the first radio channel may be applied for reception. Already established rules (defined e.g. by FCC and CEPT) may be applied as transmission specific interference rules, as appropriate.

In some embodiments, the direction-specific availability of the radio channel and the interference limitation is detected based on interference sensed by the secondary user device. These rules may involve e.g. comparing sensed interference levels to predetermined reception specific interference limits, which may be device or manufacturer specific. To detect further communication opportunities on radio channels for primary users, the secondary user device may be configured to listen also channels indicated as occupied on the basis of sensing and/or database information.

In some embodiments, the interference limitation is detected based on direction-specific channel application information available for the secondary user device. The secondary user device may be provided with channel application information, e.g. from the CM 25 or the WS database 5, 28, indicating if the secondary user device in its current location may use the first radio channel for transmission, reception, or transmission and reception. Such information may be transmitted in the secondary user system periodically and/or upon request of a secondary user device, for example. The detection of availability of the radio channel for TX, RX, or TX and RX, and allocation of the channels for one-directional use, may also involve signalling with another secondary user device. It is to be appreciated that the availability of the first radio channel may also be detected on the basis of two or more rules, such as rules applying the sensed interference and the received channel information.

In case the first radio channel is, despite the interference limitation, available for transmission or reception, the secondary user device selects 320 the first radio channel for one-directional communication with another device after detecting the interference limitation.

After the secondary user device 1, 2, 3, 21 has selected 320 the white space channel for one-directional communication with the other device to a first direction, it may evaluate the availability of one or more further (second) channels for communication to the other (second) direction, opposite to the first direction. If a second channel is available, the secondary user device selects 330 the second radio channel for one-directional communication with another device to the second direction. The second white space channel may be free of primary users or limited by interference.

The first and/or second radio channel may be a white space channel, a black space channel, or otherwise prioritized for the primary user. One-directional communication by the secondary user may be allowed on the first radio channel if this does not cause harmful interference between the primary user and the secondary user. The primary user may be communicating on the radio channel, and the interference limitation may be applied to prevent harmful interference to the primary user and/or for the secondary user. In some embodiments, the primary user is not using for data transfer the first channel, but an adjacent channel, to which use of the first channel may cause interference. Also in this case the interference limitation may be applied to prevent harmful interference to the primary user and/or the secondary user operating on adjacent channels.

The present features enable more efficient use of the radio spectrum reserved mainly for primary users, such as white space spectrum. For example, the AP 2 of FIG. 1 may be allowed to receive on the white space channel applied by the primary user 6, but not to transmit on the channel. It will be appreciated that the features of FIG. 3 may be carried out in various ways and there may be further actions before, between and after the blocks 310, 320, and 330. Some further example embodiments will be illustrated below.

In some embodiments, the interference limitation is a protection interference limitation, which refers generally to any type of limitation of channel usage to protect the primary user 1, 2, 3, 21 from interference caused by the secondary user device. A radio channel associated with such protection interference limitation may be referred to as a protection limited radio channel. The secondary user device is prevented to transmit on the white space channel in response to detecting the protection interference limitation for the channel. It is to be noted that it may be that a primary user is not using a protection limited channel, but an adjacent channel, to which use of the protection limited channel would cause interference.

Figure 4:
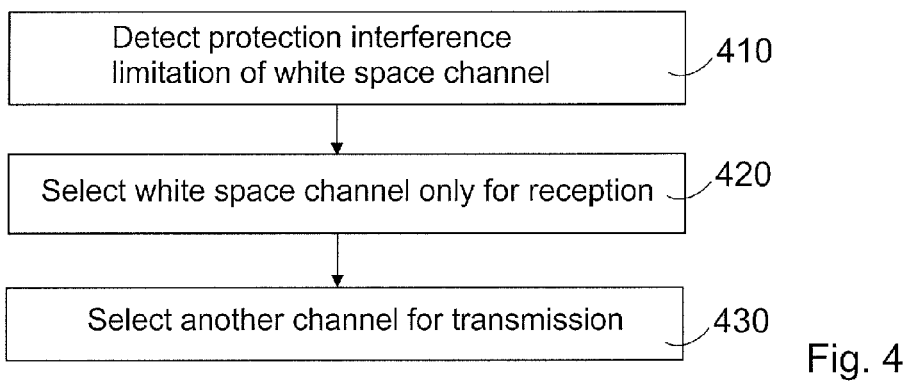

As illustrated in the embodiment of FIG. 4, the secondary user device detects 410 the protection interference limitation. For example, the protection interference limitation may be detected on the basis of white space channel usage information indicating that transmission is prevented at the current location of the secondary user device. The secondary user device checks if the white space channel is available for reception. On the basis of this check the white space channel may then be selected 420 for reception. Another channel, not associated with the protection interference limitation, is selected 430 for transmission.

In some embodiments, the secondary user device detects 410 the protection interference limitation in response to detecting that the secondary user device is located within a protection contour, e.g. a protection contour on the basis of the FCC rules. The secondary user device may define its location and send a request with the location information for an entity with access to white space database information. A response indicates if the secondary user device is allowed to transmit at its current location. Another example is that the secondary user device may receive information on location of a primary user transmitting device and a protection distance. The secondary user device may detect 410 the protection interference limitation if it is within the protection contour on the basis of the received information and the location of the secondary user device.

In some embodiments, the white space channel is used for one-directional communication from a non-access point device, such as the mobile terminal 1, to an access point device, such as the AP 2, after detecting the protection interference limitation for the access point device 2. Thus, white space spectrum can be used more efficiently, since a mobile terminal 1, 3 with less transmission power and shorter antenna is allowed to transmit on the white space channel although the mobile terminal 3 has the same distance as the AP 2 from the primary user 6.

Figure 5:
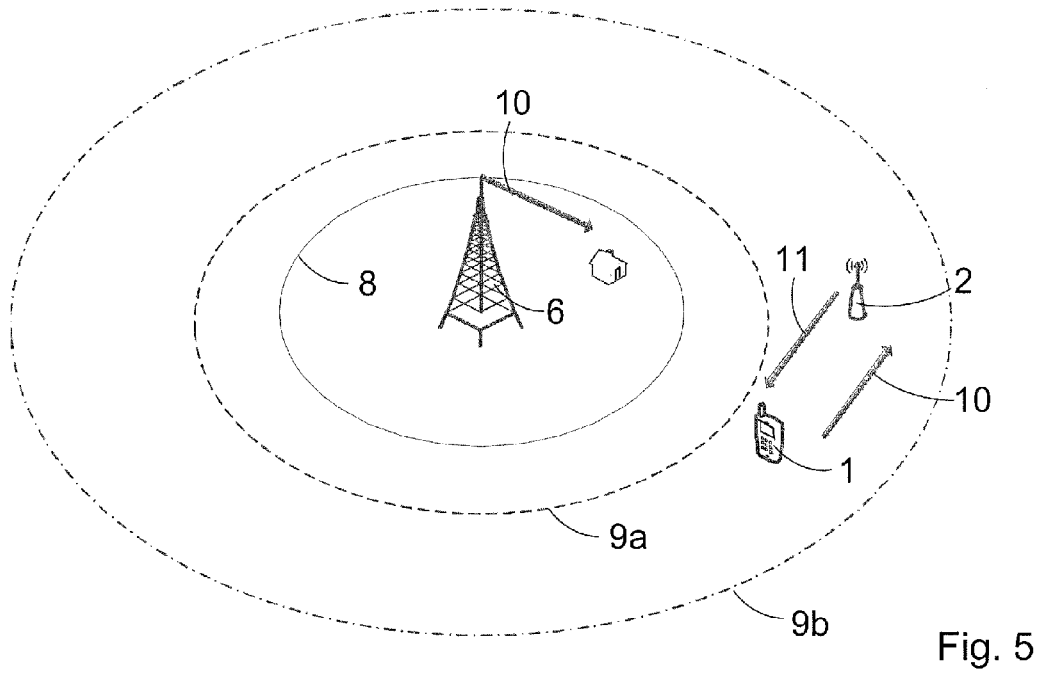
FIGS. 5, 6a and 6b illustrate application of white space channels according to some embodiments.

FIG. 5 illustrates an example for white space channel allocation for a FDD or half-duplex (HD-) FDD system. The first channel 10 represents the channel used by the primary user. Reference 9a represents the no-talk contour for the mobile terminal 1 and reference 9b represents the no-talk contour for the AP 2. Upon detecting the protection interference limitation caused by the AP situated in the no-talk zone 9b, the secondary user system, e.g. the AP 2, allocates the first channel 10 for uplink (UL) and the second channel 11 for downlink (DL). Thus, the no-talk contour 9a may define a limit distance for UL operation in the white space channel and for the mobile terminal to transmit, and the no-talk contour 9b defines a limit for DL operation and for the AP to transmit. For simplicity, it is assumed that the second channel 11 is clean of primary users and not adjacent to the first channel 10.

Figures 6A, 6B:
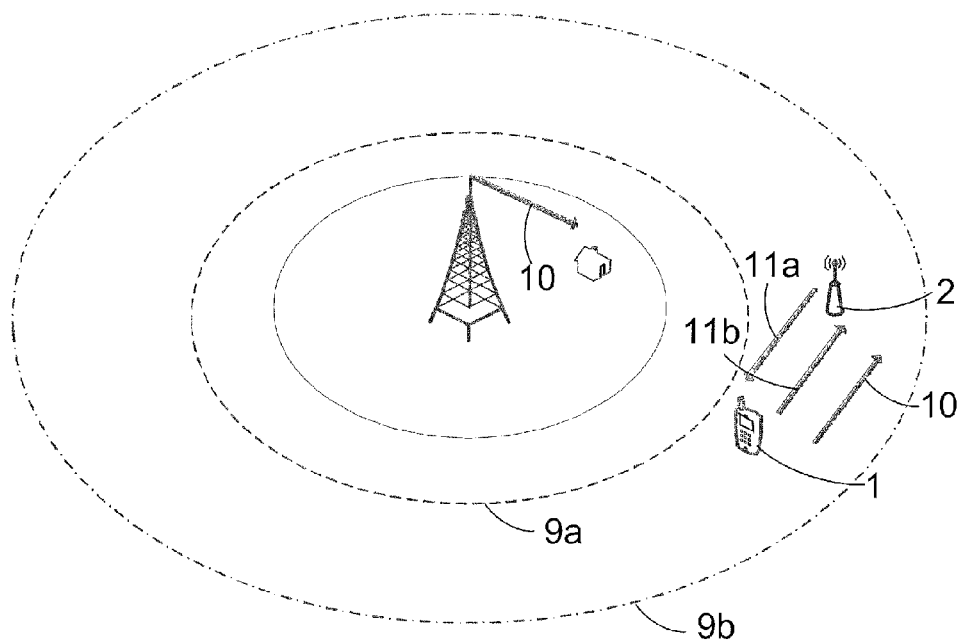

FIGS. 6a and 6b illustrate allocation of white space channels for a TDD system with carrier aggregation. DL is allocated on the second channel 11a and UL is allocated on the first channel 10 and the second channel 11b, i.e. the first channel 10 is used for expending frequency resource in UL direction. It is to be appreciated that while FIG. 6b shows a TDD system with a regular frame structure, the same principle can be applied to a Wi-Fi type of system.

In some embodiments, the interference limitation is a pollution interference limitation, which refers generally to any type of limitation to avoid or reduce interference caused by a primary user device to the secondary user device. A radio channel associated with such pollution interference limitation may be referred to as a pollution limited channel. Reception on the radio channel to the secondary user device is then prevented in response to detecting the pollution interference limitation. For example, one-directional communication on the white space channel from a non-access point device 1 to an access point device 2 is prevented in response to detecting the pollution interference to the access point device. It is to be noted that it may be that a primary user is not using a pollution limited channel, but the pollution interference limitation may be detected due to interference caused by adjacent channel(s).

As illustrated in the example of FIG. 7, the secondary user device detects 710 a pollution interference limitation and hence prevents the use of the white space channel for reception. The secondary user device checks if the white space channel is available for transmission. If it is, the secondary user device may then select 720 the white space channel for transmission. Another channel, not associated with protection interference limitation, is selected 730 for reception. The methods of FIGS. 3, 4 and 7 may be applied as control algorithm(s) in one or more devices, such as the white space device 1, 2, 3, configured to detect limitations of a white space channel.

The pollution interference limitation may be detected on the basis of sensing by the secondary user device. However, besides or in addition to sensing, the pollution interference limitation may be detected e.g. on the basis of received information regarding sensed interference and/or transmission properties of the primary user device. The secondary user device may determine the pollution interference on the basis of the location of the secondary user device, location of a primary user device, and the transmission power of the primary user device, for example. In an embodiment, the secondary user device detects the pollution interference limitation in response to detecting that the secondary user device is located within a pollution contour of the primary user device.

FIGS. 8a and 8b illustrate an example of a pollution interference limitation scenario. The average interference from a TV transmitter, experienced by the AP device 2, allocated on the first channel 10, is higher than that that of experienced by the mobile station 1. This is because of the different path losses (path loss to the AP 80 $L(h_{AP})$<$L(h_{MS})$, the path loss 82 to the mobile terminal 1), caused by the difference in antenna heights. In TDD system this interference can be prohibitively high in the uplink direction, but still tolerable in the downlink direction. Thus, the AP device 2 may be prevented on using the channel for reception even outside of the no-talk contour. An FDD, an HD-FDD or a TDD system with carrier aggregation can use also the first channel for transmission if the presently disclosed features are applied. Thus, if the interference is tolerable for the mobile terminal 1 (and since the AP 2 is outside the no-talk contour 9) the first channel 10 for may be allocated for the downlink direction in the FDD system.

As indicated in FIG. 8b, the first channel 10 may be applied for downlink expansion in the TDD system. Similarly to the previous examples, the second channel 11 is considered to be free of primary users and may be used in both directions.

Figure 9A:
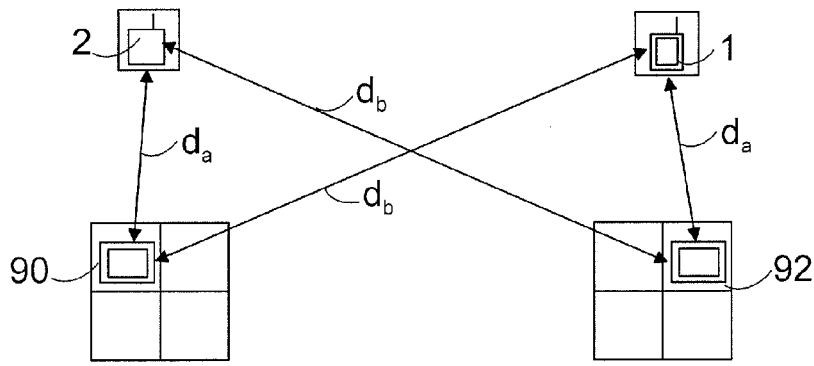
FIGS. 9a to 9c illustrate application of white space channels according to an embodiment.
Figure 9B:
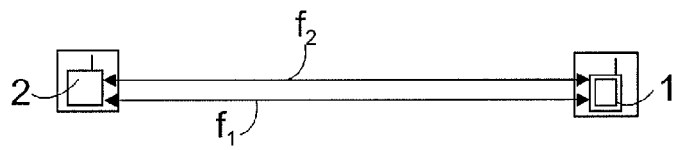
Figure 9B:
Figure 9C:
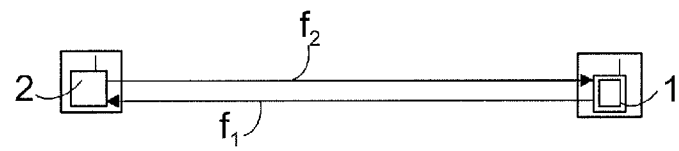
Figure 9C:

FIGS. 9a to 9c illustrate an example embodiment in a system according to planned CEPT approach. Reference is also made to CEPT Electronic Communications Committee (ECC) report 159"TECHNICAL AND OPERATIONAL REQUIREMENTS FOR THE POSSIBLE OPERATION OF COGNITIVE RADIO SYSTEMS' IN THE 'WHITE SPACES' OF THE FREQUENCY BAND 470-790 MHz", Cardiff, January 2011. Two cognitive radio (CR) devices AP 2 and mobile terminal 1 operate on two channels at frequencies $f_1$ and $f_2$. The nearest pixel 90 where $f_1$ is used by a digital terrestrial television (DTT) service is allocated at distance $d_a$ from the AP 2 and at distance $d_b$ from the mobile terminal 1. The nearest pixel 92 where $f_2$ is used by the DTT service (DTT receiver) is allocated at distance $d_b$ from the AP 2 and at distance $d_a$ from the mobile terminal 1. Symmetrical allocation is used to simplify example. Pixels with CR devices do not have allocated DTT services. Maximum permitted white space device (WSD) in-block emission levels are calculated for frequencies $f_1$ and $f_2$, as illustrated in Table 1. A CEPT database device may compute the maximum permitted WSD in-block emission levels for all pixels and channels where CR devices can be allocated.

TABLE 1

| Frequency of emission | Regulatory emission limit (linear) for the pixel containing AP | Regulatory emission limit (linear) for the pixel containing mobile terminal (MS) |
|---|---|---|
| $f_1$ | $P_1(AP)$ | $P_1(MS)$ |
| $f_2$ | $P_2(AP)$ | $P_2(MS)$ |

The emission level is calculated for each frequency and for each pair of pixels: the pixel containing the CR device and the pixel containing the DTT service. This emission level may be calculated using the DTT signal power at the DTT receiver, coupling gain, protection ratio, TV receiver antenna gain, and antenna angular/polarization discrimination. The database device then compiles the maximum permitted WSD in-block emission levels into a set of regulatory emission limits. In this example each CR device interferes only with one DTT receiver and this is why the regulatory emission limits (in the present example linear, i.e. in mW or W) correspond to the maximum permitted WSD in-block emission levels.

Let us consider, for simplicity, a situation where all of these parameters are the same, except the coupling gain, which depends on the distance and frequency. If $d_a$<<$d_b$, coupling gain $G_a$>>$G_b$, and therefore $P_1(AP)$<<$P_2(AP)$ and $P_2(MS)$<<$P_1(MS)$.

Due to inequalities illustrated above, application of the presently disclosed features and usage of each of the frequency channels only in one direction (FDD mode), as illustrated in FIG. 9c, allows CR devices to operate at higher maximum power than using them in both directions (TDD mode) as illustrated in FIG. 9b.

In this example, the maximum TX power of the AP in TDD mode with 1:1 UL/DL ratio is equal to:

$$(P_1(AP)+P_2(AP))/2 \approx P_2(AP)/2.$$

The maximum TX power of the MS in the TDD mode is equal to:

$$(P_1(MS)+P_2(MS))/2 \approx P_1(MS)/2.$$

The maximum TX power of the AP in the FDD mode is equal to:

$$P_2(AP).$$

The maximum TX power of the MS in the FDD mode is equal to:

$$P_1(MS).$$

The mobile terminal device 1, 3 may comprise a controller configured to control at least some of the above-illustrated features on the basis of information received via an RF module and/or memory. The controller may encompass means for causing the mobile terminal to select one-directional communication on a radio channel after detecting the interference limitation on the radio channel. An apparatus comprising the controller may also be arranged to implement at least some of the further related embodiments illustrated below. Similarly, the AP 2 may comprise a controller configured to control features illustrated above.

Embodiments of the present invention and means to carry out these embodiments in an apparatus, such as the mobile terminal device 1, 3 and/or a wireless access device 2, may be implemented in software, hardware, application logic or a combination of software, hardware and application logic. In an example embodiment, the application logic, software or an instruction set is maintained on any one of various conventional computer-readable media.

In one example embodiment, there may be provided circuitry configured to provide at least some functions illustrated above, such as the features illustrated in FIG. 3, 4, and/or 7. As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware.

Although single enhanced entities were depicted above, it will be appreciated that different features may be implemented in one or more physical or logical entities. For instance, the apparatus may comprise a specific functional module for carrying one or more of the blocks in FIGS. 3 and 4. In some embodiments, a chip unit or some other kind of hardware module is provided for controlling a radio device operable on white space channels, such as the mobile terminal device 1, 3 or an AP 2.

Figure 10:
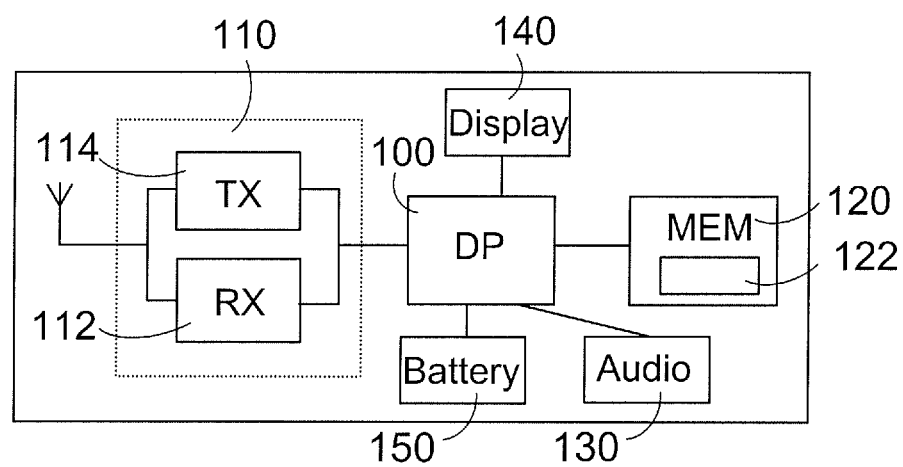
FIG. 10 illustrates a mobile communications device according to an embodiment.

FIG. 10 is a simplified block diagram of high-level elements of a mobile communications device according to an embodiment. The device may be configured to function as the mobile terminal device 1, 2, and carry out at least some of the functions illustrated above for the secondary user device.

In general, the various embodiments of the device can include, but are not limited to, cellular telephones, personal digital assistants (PDAs), laptop/tablet computers, digital book readers, imaging devices, gaming devices, media storage and playback appliances, Internet access appliances, as well as other portable units or terminals that incorporate wireless communications functions.

The device comprises a data processing element DP 100 with at least one data processor and a memory 120 storing a program 122. The memory 120 may be implemented using any data storage technology appropriate for the technical implementation context of the respective entity. By way of example, the memory 120 may include non-volatile portion, such as EEPROM, flash memory or the like, and a volatile portion, such as a random access memory (RAM) including a cache area for temporary storage of data. The DP 100 can be implemented on a single-chip, multiple chips or multiple electrical components. The DP 100 may be of any type appropriate to the local technical environment, and may include one or more of general purpose computers, special purpose computers (such as an application-specific integrated circuit (ASIC) or a field programmable gate array FPGA), digital signal processors (DSPs) and processors based on a multi-processor architecture, for instance.

The device may comprise at least one radio frequency transceiver 110 with a transmitter 114 and a receiver 112 and capable of operating on white space channels. However, it will be appreciated that in many cases a mobile communications device is a multimode device. By way of illustration, the electronic device may comprise radio units 110 to operate in accordance with any of a number of second, third and/or fourth-generation communication protocols or the like. For example, the device may operate in accordance with one or more of GSM protocols, 3G protocols by the 3GPP 3G protocols, CDMA2000 protocols, 3GPP Long Term Evolution (LTE) protocols, short-range wireless protocols, such as the Bluetooth, and the like. The device may comprise multiple transmitting and/or receiving antenna elements (not shown in FIG. 10). In some embodiments, the device comprises a sensor for detecting interference and providing a signal associated with the level of detected interference. The sensor may be provided by an energy detector, for example.

The DP 100 may be arranged to receive input from UI input elements, such as an audio input circuit connected to a microphone and a touch screen input unit, and control UI output, such as audio circuitry 130 connected to a speaker and a display 140 of a touch-screen display. The device also comprises a battery 150, and may also comprise other UI output related units, such as a vibration motor for producing vibration alert.

It will be appreciated that the device typically comprises various further elements, such as further processor(s), further communication unit(s), user interface components, a media capturing element, a positioning system receiver, sensors, such as an accelerometer, and a user identity module, not discussed in detail herein. The device may comprise chipsets to implement at least some of the high-level units illustrated in FIG. 10. For example, the device may comprise a power amplification chip for signal amplification, a baseband chip, and possibly further chips, which may be coupled to one or more (master) data processors.

An embodiment provides a computer program embodied on a computer-readable storage medium. The program, such as the program 122 in the memory 120, may comprise computer program code configured to, with the at least one processor, cause an apparatus, such as the device 1, 2, 3 or the device of FIG. 10, to perform at least some of the above-illustrated white space channel usage related features illustrated in connection with FIGS. 3 to 9c. In the context of this document, a "computer-readable medium" may be any media or means that can contain, store, communicate, propagate or transport the instructions for use by or in connection with an instruction execution system, apparatus, or device, such as a computer, with some examples of a computer being described and depicted in connection with FIG. 10. A computer-readable medium may comprise a tangible and non-transitory computer-readable storage medium that may be any media or means that can contain or store the instructions for use by or in connection with an instruction execution system, apparatus, or device, such as a computer.

Although the specification refers to "an", "one", or "some" embodiment(s) in several locations, this does not necessarily mean that each such reference is to the same embodiment(s), or that the feature only applies to a single embodiment. Single features of different embodiments may also be combined to provide other embodiments. If desired, at least some of the different functions discussed herein may be performed in a different order and/or concurrently with each other. Furthermore, if desired, one or more of the above-described functions may be optional.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A method, comprising:
  detecting, by a secondary user apparatus, either a first radio channel to be free of primary users or an interference limitation of the first radio channel for which a primary user apparatus has priority over the secondary user apparatus;
  if the first radio channel is detected to be free of primary users, selecting, by the secondary user apparatus, the first radio channel for communication with another apparatus to both a first direction and a second direction, opposite to the first direction;
  if the interference limitation of the first radio channel is detected, selecting, by the secondary user apparatus, the first radio channel for communication with the another apparatus to the first direction after detecting the interference limitation, and selecting, by the secondary user apparatus, a second radio channel for communication with the another apparatus to the second direction.

2. The method of claim 1, wherein at least one of the first radio channel and the second radio channel is at least one of white space channel and a black space channel.

3. The method of claim 1, wherein the secondary user apparatus applies at least one of a transmission specific interference limit to determine if the first radio channel may be applied for transmission and a reception-specific interference limit to determine if the first radio channel may be applied for reception.

4. The method of claim 1, wherein the second radio channel is free of primary users or limited by interference.

5. The method of claim 1, wherein the interference limitation is a pollution interference limitation caused by the primary user apparatus to the secondary user apparatus, and communication on the first radio channel to the secondary user apparatus is prevented in response to detecting the pollution interference limitation.

6. The method of claim 1, wherein the interference limitation is a protection interference limitation to protect the primary user from interference caused by the secondary user apparatus, and the secondary user apparatus is prevented to transmit on the first radio channel in response to detecting the protection interference limitation.

7. The method of claim 6, wherein the secondary user apparatus detects the protection interference limitation in response to detecting that the secondary user apparatus is located within a protection contour.

8. The method of claim 1, wherein a request indicating the current location of the secondary user apparatus is sent,
  a response with information indicating the availability of at least the first radio channel at the current location of the secondary user apparatus is received, and
  the interference limitation is detected on the basis of the received response.

9. The method of claim 1, wherein the first radio channel is a television white space channel.

10. An apparatus, comprising:
  at least one processor; and
  at least one memory including computer program code,
  the at least one memory and the computer program code configured to, with the at least one processor, cause the apparatus at least to:
    detect either a first radio channel to be free of primary users or an interference limitation of the first radio channel for a secondary user apparatus, a primary user apparatus having priority over the secondary user apparatus for the first radio channel;
    if the first radio channel is detected to be free of primary users, select, by the apparatus, the first radio channel for communication with another apparatus to both a first direction and a second direction, opposite to the first direction;
    if the interference limitation of the first radio channel is detected, select the first radio channel for communication between the secondary user apparatus and the another apparatus to the first direction after detecting the interference limitation, and select a second radio channel for communication with the another apparatus to the second direction.

11. The apparatus of claim 10, wherein at least one of the first radio channel and the second radio channel is at least one of white space channel and a black space channel.

12. The apparatus of claim 10, wherein the apparatus is further configured to apply at least one of a transmission specific interference limit to determine if the first radio channel may be applied for transmission and a reception-specific interference limit to determine if the first radio channel may be applied for reception.

13. The apparatus of claim 10, wherein the apparatus is configured to prevent communication on the first radio channel to the second direction in response to the detected interference limitation.

14. The apparatus of claim 10, wherein the interference limitation is a pollution interference limitation caused by the primary user apparatus to the secondary user apparatus, and the apparatus is configured to prevent communication on the first radio channel to the secondary user apparatus in response to detecting the pollution interference limitation.

15. The apparatus of claim 14, wherein the apparatus is configured to control use of the first radio channel for a first one-directional communication from an access point apparatus to a non-access point apparatus in response to detecting the pollution interference to the access point apparatus or for a second one-directional communication from the non-access point apparatus to the access point apparatus in response to detecting the pollution interference to the non-access point apparatus.

16. The apparatus of claim 10, wherein the interference limitation is a protection interference limitation to protect the primary user apparatus from interference caused by the secondary user apparatus, and the apparatus is configured to prevent transmission on the first radio channel in response to detecting the protection interference limitation.

17. The apparatus of claim 16, wherein the apparatus is configured to control use of the first radio channel for a first one-directional communication from a non-access point apparatus to an access point apparatus after detecting the protection interference limitation for the access point apparatus or for a second one-directional communication from the access point apparatus to the non-access point apparatus in response to detecting the protection interference for the non-access point apparatus.

18. The apparatus of claim 10, wherein the apparatus is configured to send a request indicating current location of the secondary user apparatus,
the apparatus is configured to detect the interference limitation on the basis of a received response with information indicating the availability of at least the first radio channel at the current location of the secondary user apparatus.

19. The apparatus of claim 10, wherein the first radio channel is a television white space channel.

20. The apparatus of claim 10, wherein the apparatus is a mobile communications terminal device or access point comprising the secondary user apparatus and a transceiver for communicating according to a wireless local area network standard.

* * * * *